United States Patent
Antia et al.

(10) Patent No.: US 6,487,251 B1
(45) Date of Patent: Nov. 26, 2002

(54) SYSTEM AND METHOD FOR PERFORMING COMBINED MULTI-RATE CONVOLUTIONAL CODING

(75) Inventors: Yezdi Antia, Gaithersburg, MD (US); Zhen-Liang Shi, Germantown, MD (US); A. Roger Hammons, Jr., North Potomac, MD (US); Olga Ritterbush, Germantown, MD (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/386,053

(22) Filed: Aug. 30, 1999

(51) Int. Cl.[7] ............................................... H04L 27/01
(52) U.S. Cl. ................... 375/259; 375/265; 375/240.24
(58) Field of Search ................................. 375/259, 265, 375/225, 240, 240.24, 219, 220; 714/748, 749, 822

(56) References Cited

U.S. PATENT DOCUMENTS 5,991,285 A * 11/1999 Ghosh ......................... 370/335
6,249,677 B1 * 6/2001 Noerpel et al. ............. 455/427
6,275,488 B1 * 8/2001 Cudak et al. ................ 370/347

* cited by examiner

Primary Examiner—Mohammad H. Ghayour
(74) Attorney, Agent, or Firm—John T. Whelan; Michael W. Sales

(57) ABSTRACT

A system and method for establishing an integrated forward error correction (FEC) scheme to perform multi-rate encoding on different priority data bits of a channel access message transmitted on a random access channel between devices of a communications network, such as between an access terminal and a base station of a satellite-based communications network. The channel access message includes a first data group representing first information and a second data group representing second information, which is transmitted between an access terminal and a base station in a satellite-based communications network. The system and method encodes the second data group at an encoding rate to provide a second encoded data group, and encodes the first data group at the same encoding rate to provide a first encoded data group. The encoding of the first and second data groups is performed by a single encoder, such as a rate ¼ convolutional encoder. The second encoded data group is transmitted from the access terminal to the base over a random access channel. The second encoded data group further can be punctured during transmission to in effect decrease its coding rate, for example, to rate ½ coding. The first encoded data group is transmitted from the access terminal to the base station, and is then retransmitted from the access terminal to the base station to in effect increase the rate of coding of the first encoded data group to, for example, ⅛ coding. At the base station, a combiner/demodulator combines the transmitted and retransmitted first encoded data group, and the combined first encoded data groups and the second encoded data group are then decoded by a decoder.

24 Claims, 2 Drawing Sheets

SYSTEM AND METHOD FOR PERFORMING COMBINED MULTI-RATE CONVOLUTIONAL CODING

BACKGROUND OF THE INVENTION

1. Field of the Invention

The present invention relates to a system and method, for use with a network, such as a satellite-based communications network, which establishes an integrated forward error correction (FEC) scheme to perform multi-rate encoding/decoding on different priority data bits transmitted, for example, on a random access channel. More particularly, the present invention relates to a system and method for using a single encoder to perform multi-rate encoding/decoding on different priority data bits of a channel request message transmitted on a random access channel from an access terminal to a base station of a satellite-based communications network.

2. Description of the Related Art

A satellite-based communications network, such as a geosynchronous earth orbit mobile (GEM) satellite communications network, comprises at least one geosynchronous earth orbit satellite, a ground-based advanced operations center (AOC) and spacecraft operations center (SOC) associated with the satellite, at least one ground-based gateway station (GS), and at least one access terminal (AT), which is typically a hand-held or vehicle mounted mobile telephone. The satellite enables the access terminal to communicate with other access terminals, or with other telephones in the terrestrial public switched telephone network (PSTN), via the gateway stations under the control of the gateway stations. The AOC provides system-wide resource management and control functions for its respective satellite, and the SOC controls on-orbit satellite operations for its respective satellite.

When an access terminal is operated to establish a radio resource connection, it generates and transmits a channel request message to the network on a random access channel (RACH) at a frequency assigned by the gateway station to a spot beam covering an area in which the access terminal is located. A channel request message includes data used to represent the mobile access terminal, as well as contention resolution and timing synchronization information.

Typically, the data bits of a channel request message are classified into two classes, namely, Class I bits and Class II bits. The Class I bits generally consists of a short block of data bits, and represent high priority information, such as data for contention resolution and timing synchronization between the access terminal and the base station, which is essential in enabling the access terminal to gain access to the satellite communications network. Therefore, the Class I data bits must be received with high probability by the base station the first time they are transmitted.

On the other hand, the Class II bits typically consist of a longer block of data bits, and are not as crucial as the Class I bits for call set up. Class II bits thus have a lower priority than the Class I bits. Class II bits can include, for example, data for accelerating call set up time, which can include information such as the called party number, location of the access terminal placing the call, identification of the service provider for the access terminal, and so on.

During transmission of a channel request message, an access terminal will encode the Class I and Class II bits to increase the probability that they will be received intact by the base station. Class II bits can be encoded using, for example, a GEM baseline rate ½ convolutional code. However, because the Class I bits are necessary for call set up and have a higher priority than the Class II bits, the access terminal will encode the Class I bits at a higher rate convolutional code.

Because the block of Class I bits generally has a short length, it is difficult to convolutionally encode the block of Class I bits by itself. Therefore, to encode the Class I bits, an access terminal can include a block code encoder in addition to the convolutional encoder used to encode the Class II bits. In this event, the base station receiving the encoded channel request message would require a block code decoder to decode the encoded Class I bits in addition to a convolutional decoder for decoding the Class II bits. These additional block code encoders and decoders in the access terminal and base station increase the overall complexity of the system, which can result in additional cost of the system as well.

Accordingly, a need exist for a satellite-based communications network capable of encoding and decoding data bits of different priorities in a channel request message at different coding rates without using additional encoders and decoders.

SUMMARY OF THE INVENTION

An object of the present invention is to provide a system and method for establishing an integrated forward error correction (FEC) scheme to perform multi-rate encoding/decoding on different priority data bits of a channel request message transmitted over a random access channel in a satellite-based communications network, without using multiple encoders and multiple decoders.

Another object of the invention is to provide a system and method which uses an encoder having a single coding rate to encode different priority bits of a channel request message transmitted over a random access channel in a mobile satellite communications network at different coding rates which are dependent on the respective priorities of the data bits.

A further object of the invention is to provide a system and method which uses a single encoder in an access terminal of a satellite-based communications network to encode different priority data bits of a channel request message at different respective encoding rates, and which uses a single decoder in a base station of the communications network to decode the differently encoded bits of the channel request message received from the access terminal over a random access channel.

These and other objects of the invention are substantially achieved by providing a system and method for encoding data, including a first data group representing first information and a second data group representing second information, which is transmitted between an access terminal and a base station in a satellite-based communications network. The system and method encodes the second data group at an encoding rate to provide a second encoded data group, and encodes the first data group at the same encoding rate to provide a first encoded data group. The encoding of the first and second data groups is performed by a single encoder, such as a rate ¼ convolutional encoder. The second encoded data group is transmitted between the access terminal and the base station or, in particular, from the access terminal to the base station over a random access channel, for example. The second encoded data group further can be punctured during transmission to in effect decrease its coding rate, for example, to rate ½ coding. The first encoded data group is transmitted from the access terminal to the base station, and is then retransmitted from the access terminal to the base station to in effect increase the rate of coding of the first encoded data group to, for example, ⅛ coding. As can be appreciated by one skilled in the art, the transmission of the second encoded data group, and the transmission and retransmission of the first encoded data group, occurs within a single burst. At the base station, a combiner/demodulator combines the transmitted and retransmitted first encoded data group, and the combined first encoded data groups and the second encoded data group are then decoded by a decoder at the base station.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

Figure 1:
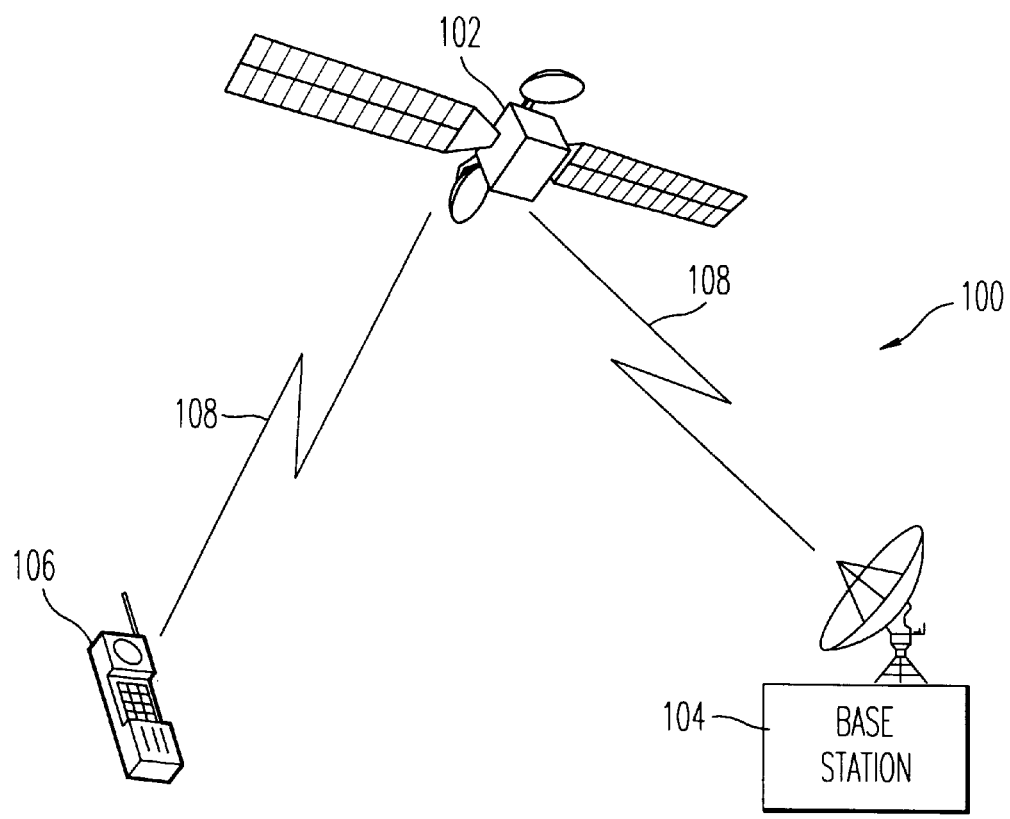
FIG. 1 is a block diagram of a satellite communications network employing a system and method according to an embodiment of the present invention.

FIG. 1 is a block diagram illustrating an example of a satellite-based communications network 100 employing a system and method according to an embodiment of the present invention. The satellite-based communications network 100 includes at least one satellite 102 which is, for example, a geosynchronous earth orbit satellite, at least one base station 104, and at least one access terminal 106.

As discussed above, during call set up, the access terminal 106 transmits a channel request message to the base station 104 over a random access channel 108. A channel request message includes Class I data bits, Class II data bits and Tail bits. The Class I data bits can be a short block of 23 bits representing information necessary for call set up which, as discussed above, can include data for contention resolution and timing synchronization between the access terminal 106 and the base station 104. The Class H data bits can be a longer block of, for example, 135 bits, representing information less crucial for call set up, such as information for accelerating call set up time.

Figure 2:
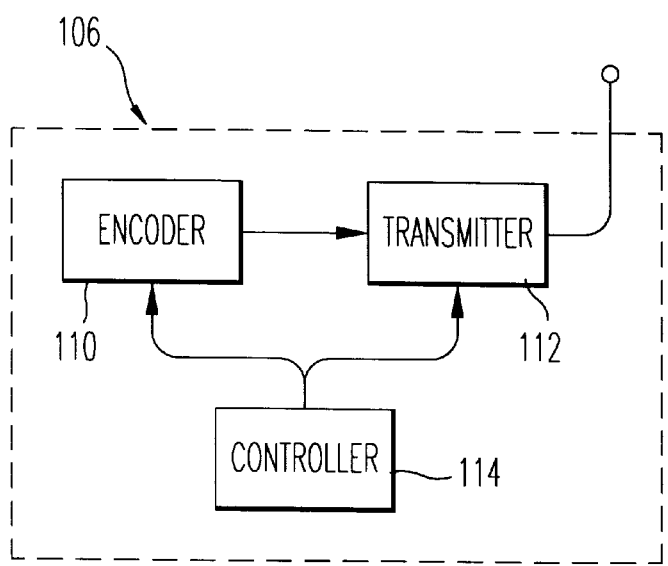
FIG. 2 is a detailed block diagram illustrating an example of an access terminal shown in FIG. 1 employing an encoder and transmitter arrangement according to an embodiment of the present invention.

As shown in FIG. 2, an access terminal 106 includes, among other things, an encoder 110, a transmitter 112, and a controller 114 which controls the encoder 110 and transmitter 112 to encode and transmit the Class I, Class II and tail bits of the channel request message. In this example, the encoder can be a rate ¼ convolutional encoder as known in the art. In this example, the rate ¼ convolutional code encoder 110 is set to be rate-compatible with a GEM baseline rate ½ code of constraint length 5, and is defined the following generator polynomials:

$$g_0(D)=1+D^3+D^4$$

$$g_1(D)=1+D+D^2+D^4$$

$$g_2(D)=1+D^2+D^4$$

$$g_3(D)=1+D+D^2+D^3+D^4$$

where generator polynomials $g_0$ and $g_1$ define the baseline rate ½ convolutional code.

Figure 3:
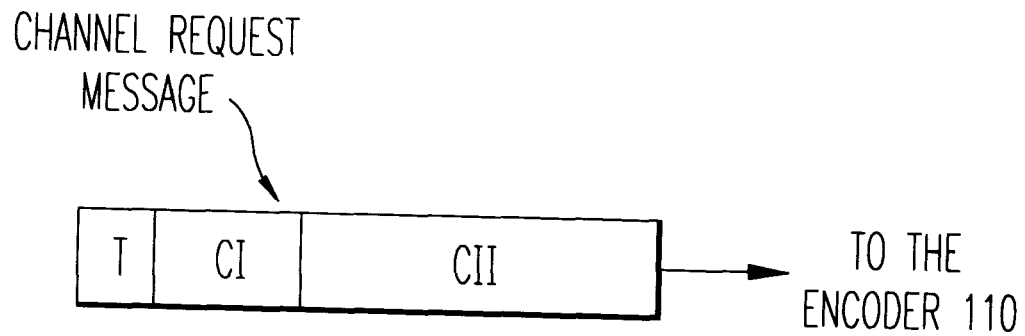
FIG. 3 is an exemplary block diagram illustrating Class I, Class II and tail bits of a channel request message to be encoded by the encoder of the access terminal shown in FIG. 2.

The encoding of the Class I, Class II and Tail bits are performed according to an integrated forward error correction (FEC) scheme to achieve multi-rate convolutional encoding for the different classes of bits. Specifically, the controller 114 includes or controls, for example, a channel request message generator which generates the Class I, Class II and Tail bits of the channel request message, and inputs those bits into the rate ¼ convolutional encoder 110 in blocks. As shown in FIG. 3, the Class II bits (C II) are input first into the encoder 110, followed by the Class I bits (C I) and the Tail bits (T). The encoding is performed in a block mode using zero-value tail bits to flush the encoder 110. The Class I, Class II and Tail bits are each encoded at rate ¼ by the convolutional encoder 110, and are output by the encoder 110 to the transmitter 112 as a block of rate ¼ coded bits.

To achieve the desired coding rates for the Class I, Class II and Tail bits, the controller 114 controls the transmitter 112 as follows. When the transmitter 112 transmits the Class II data bits, only the Class II bits corresponding to the two arms of the baseline rate ½ convolutional code are transmitted, while the bits produced by the other two arms are punctured by applying a puncturing mask $[1100]^T$ to the encoded Class II data bits. The controller 114 then controls the transmitter 112 to transmit the encoded Class I data bits twice, and afterward, controls the transmitter to transmit the encoded tail bits. The puncturing of the Class II data bits effectively lowers the coding rate of the Class II data bits to rate ½ convolutional coding, while the retransmission of the Class I data bits effectively increases the coding rate to rate ⅛ convolutional coding for the Class I data bits.

Figure 4:
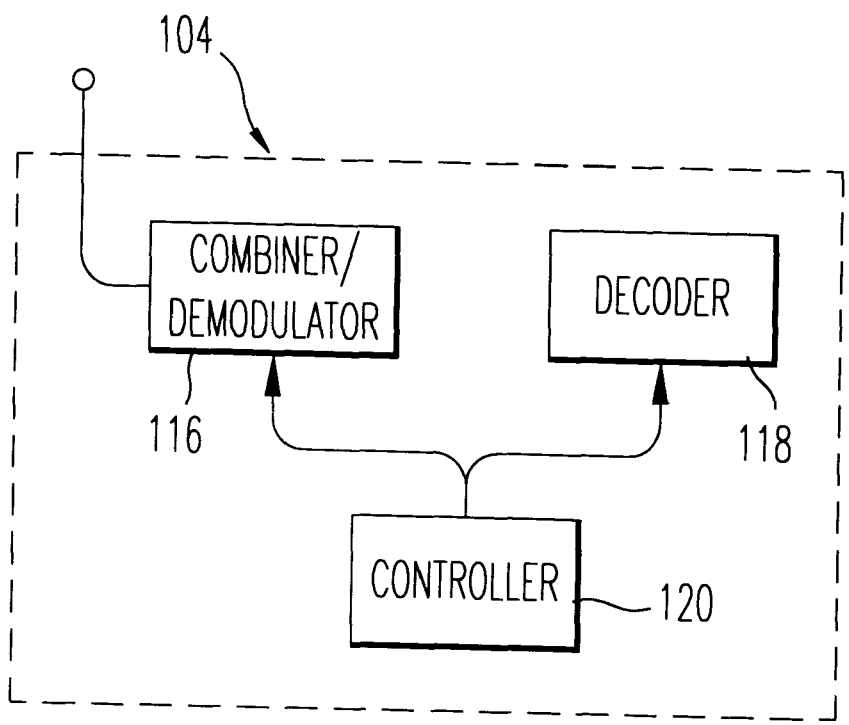
FIG. 4 is a detailed block diagram illustrating an example of a base station shown in FIG. 1 employing a combiner/demodulator and decoder arrangement according to an embodiment of the present invention.

As discussed above, the encoded Class I, Class II and Tail bits are transmitted in a channel request message by the access terminal 106 to the base station 104 over a random access channel 108. As shown in FIG. 4, the base station 104 includes, among other things, a combiner/demodulator 116, a decoder 118, and a controller 120. The decoder 118 can be, for example, a rate ¼ Viterbi decoder as known in the art.

When the base station 104 receives the encoded channel request message, the controller 120 controls the combiner/demodulator 116 to combine the two received groups of encoded Class I bits (the encoded Class I bits were transmitted twice by the transmitter 112 of the access terminal 106), and to output the combined Class I data bits to the decoder 118. The received encoded Class II bits and received encoded Tail bits are also input to the decoder 118. Accordingly, the Class I bits are in effect received and decoded at ⅛ rate coding, the Class II bits are in effect received and decoded at ½ rate coding, and the Tail bits are in effect received and decoded at rate ¼ coding.

As can be appreciated by one skilled in the art, the order in which data blocks are encoded at different coding rates is very crucial. Technically, convolutional codes are not equal error protecting codes for all bits, because the initial bits being input into the encoder 110 and the last bits being input into encoder 110 will have a lower bit error rate (BER) than the middle bits entering the encoder. Because the Class I bits require high priority encoding, it is conceivable that instead of inputting the Class I, Class II and Tail bits to the encoder 110 in the order shown in FIG. 3, the Class I bits can be divided into two data blocks and input to the encoder 110 in a different order.

For example, the first half of the Class I bits could be input to the encoder 110 and encoded first, followed by the Class II bits, the second half of the Class I bits, and the Tail bits, in that order. This order of encoding would be effective if the Class I and Class II bits were to ultimately be encoded by the same code rates. However, because a combiner in the combiner/demodulator 116 at the base station 104 performs a maximum ratio combining on the repeated Class I coded sequence, the demodulated Class II bit error rate is 3 dB poorer than the demodulated Class I bits error rate. Thus, at low signal to noise ratios (SNR), high BERs in the Class II demodulated bits cause the trellis traceback at the decoder 118 to be incorrect, which adversely affects decoding of the first half of Class I bits and worsens the bit error rate of the decoded Class I data bits.

In addition, because the Class II data bits have been encoded with the weaker code of rate ½, neutral data bits are inserted into the encoded Class II to compute the branch metric for the rate ¼ decoder 118. The insertion of neutral bits affects the transition boundaries between the Class I and Class II data bits, and therefore, would further worsen the bit error rate of the decoded Class I data bits. However, by encoding the Class I, Class II and Tail data bits in the order shown in FIG. 3, the traceback and boundary problems are eliminated.

Working Example

The continuous transmission of RACH burst was simulated for AWGN and two Rician channels (a slow fading channel with a k factor of 9 and a fading bandwidth (BW) of 10 Hz, and a fast fading channel with a k factor of 12 and a fading BW of 200). The error rates obtained for Class I and Class II bits, encoded and decoded, together using an integrated FEC scheme described above, were compared to those of conventional rate ½ and rate ¼ decoders. The results have shown that the integrated FEC scheme did not degrade the error rate performance of either convolutional code, and the desired protection for both Class I and Class II bits was realized.

Accordingly, the integrated FEC scheme as described above for coding of the RACH information bits achieves the desired rate ½ protection for Class II bits, and extra, effective rate ⅛, protection for Class I bits. The use of the same encoder and decoder to encode and decode the Class I and Class II bits eliminates the need to complicate the system by using an additional encoder and decoder. Eliminating the need for an additional encoder and decoder also eliminates any problems which could arise when switching between the different encoders and decoders. Furthermore, the computational overhead of using a rate ¼ decoder employed by the integrated scheme is minimal over a standard rate ½ decoder used in GEM. In addition, by grouping the Class I and Class II bits together during encoding enables the system to use a rate ¼ convolutional code for a block of Class I bits, that could not, by itself, be protected with convolutional code because of its short length.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A method for encoding data transmitted between a transmitter and a receiver in a communications network, said data including a first data group representing first information and a second data group representing second information, the method comprising the steps of:

encoding said second data group at an encoding rate to provide a second encoded data group;

encoding said first data group at said encoding rate to provide a first encoded data group;

transmitting said second encoded data group between said transmitter and said receiver;

transmitting said first encoded data group between said transmitter and said receiver; and re transmitting said first encoded data group between said transmitter and said receiver to in effect increase a rate of coding of said first encoded data group.

2. A method as claimed in claim 1, wherein:

said retransmitting step in effect doubles said rate of coding of said first encoded data group at which said first encoded data group was encoded by said first data group encoding step.

3. A method as claimed in claim 1, further comprising the step of:

puncturing said second encoded data group to in effect decrease a rate of coding of said second encoded data group.

4. A method as claimed in claim 3, wherein:

said puncturing step in effect halves said rate of coding of said second encoded data group at which said second encoded data group was encoded by said second data group encoding step.

5. A method as claimed in claim 3, wherein:

said puncturing step is performed prior to or while performing said second encoded data group transmitting step.

6. A method as claimed in claim 3, wherein:

after performing said transmitting steps, said retransmitting step and said puncturing step, said rate of coding of said second encoded data group is in effect ¼ of said rate of coding of said first encoded data group.

7. A method as claimed in claim 1, wherein:

said transmitter is at an access terminal of a satellite-based communications network and said receiver is at a base station of said satellite-based communications network; and said step of transmitting said second encoded data group and said steps of transmitting and retransmitting said first encoded data group transmit their respective said first and second encoded data groups between said access terminal and said base station.

8. A method as claimed in claim 7, wherein:

said step of transmitting said second encoded data group and said steps of transmitting and retransmitting said first encoded data group transmit their respective said first and second encoded data groups from said access terminal to said base station.

9. A method as claimed in claim 1, wherein:

said second data group encoding step is performed prior to said first data group encoding step.

10. A method as claimed in claim 1, wherein said data includes a third data group, and the method further comprises the steps of:
  encoding said third data group at said encoding rate to provide a third encoded data group;
  transmitting said third encoded data group between said transmitter and said receiver; and
  retransmitting said third encoded data group between said transmitter and said receiver to in effect increase a rate of coding of said third encoded data group.

11. A method as claimed in claim 10, wherein:
  said second data group encoding step is performed before said first data group encoding step, and said first data group encoding step is performed before said third data group encoding step.

12. A method as claimed in claim 1, further comprising the step of:
  receiving at said receiver said first encoded data groups transmitted and retransmitted by said first encoded data group transmitting and retransmitting step; and
  combining said received first encoded data groups.

13. A system for encoding data transmitted between a first and second devices in a communications network, said data including a first data group representing first information and a second data group representing second information, the system comprising:
  an encoder, adapted to encode said second data group at an encoding rate to provide a second encoded data group, and to encode said first data group at said encoding rate to provide a first encoded data group; and
  a transmitter, adapted to transmit said second encoded data group between said first and second devices, to transmit said first encoded data group between said first and second devices, and to retransmit said first encoded data group between said first and second devices to in effect increase a rate of coding of said first encoded data group.

14. A system as claimed in claim 13, wherein:
  said transmitter in effect doubles said rate of coding of said first encoded data group at which said first encoded data group was encoded by said encoder by retransmitting said first encoded data group.

15. A system as claimed in claim 13, wherein:
  said transmitter is adapted to apply a puncturing mask to said second encoded data group to in effect decrease a rate of coding of said second encoded data group.

16. A system as claimed in claim 15, wherein:
  said puncturing mask applied by said transmitter in effect halves said rate of coding of said second encoded data group at which said second encoded data group was encoded by said encoder.

17. A system as claimed in claim 15, wherein:
  after said transmitter has transmitted and retransmitted said first encoded data, and has punctured and transmitted said second encoded data, said rate of coding of said second encoded data group is in effect ¼ of said rate of coding of said first encoded data group.

18. A system as claimed in claim 13, wherein:
  said first and second device include an access terminal and a base station, respectively, of a satellite-based communications network.

19. A system as claimed in claim 13, wherein:
  said transmitter is at an access terminal of a satellite-based communications network to transmit said second encoded data group and transmit and retransmit said first encoded data group from said access terminal to a base station of said satellite-based communications network.

20. A system as claimed in claim 13, wherein:
  said encoder is adapted to encode said second data group prior to encoding said first data group.

21. A system as claimed in claim 13, wherein:
  said data includes a third data group;
  said encoder is adapted to encode said third data group at said encoding rate to provide a third encoded data group; and
  said transmitter is adapted to transmit said third encoded data group between said first and second devices, and retransmit said third encoded data group between said first and second devices, to in effect increase a rate of coding of said third encoded data group.

22. A system as claimed in claim 21, wherein:
  said encoder is adapted to encode said second data group before encoding said first data group, and is adapted to encode said first data group before encoding said third data group.

23. A system as claimed in claim 13, further comprising:
  a combiner, adapted to receive said first encoded data groups transmitted and retransmitted by said transmitter, and to combine said received first encoded data groups.

24. A system as claimed in claim 23, wherein:
  said combiner is at said second device, which includes a base station of a satellite-based communications network.

* * * * *